US009930416B1

(12) United States Patent
Buchheit

(10) Patent No.: US 9,930,416 B1
(45) Date of Patent: *Mar. 27, 2018

(54) PLAYBACK DEVICE THAT REQUESTS AND RECEIVES A USER TAILORED VIDEO STREAM USING CONTENT OF A PRIMARY STREAM AND AN ENHANCED STREAM

(71) Applicant: Brian K. Buchheit, Weston, FL (US)

(72) Inventor: Brian K. Buchheit, Weston, FL (US)

( * ) Notice: Subject to any disclaimer, the term of this patent is extended or adjusted under 35 U.S.C. 154(b) by 121 days.

This patent is subject to a terminal disclaimer.

(21) Appl. No.: 15/257,419

(22) Filed: Sep. 6, 2016

Related U.S. Application Data

(63) Continuation of application No. 14/721,110, filed on May 26, 2015, now Pat. No. 9,438,937, and a continuation-in-part of application No. 13/118,679, filed on May 31, 2011, now Pat. No. 9,041,860.

(51) Int. Cl.
| | |
|---|---|
| *H04N 21/234* | (2011.01) |
| *H04N 21/242* | (2011.01) |
| *H04N 21/4728* | (2011.01) |
| *H04N 21/218* | (2011.01) |
| *H04N 21/2187* | (2011.01) |
| *H04N 21/43* | (2011.01) |

(52) U.S. Cl.
CPC ..... *H04N 21/4728* (2013.01); *H04N 21/2187* (2013.01); *H04N 21/21805* (2013.01); *H04N 21/23424* (2013.01); *H04N 21/4307* (2013.01)

(58) Field of Classification Search
CPC .................................................. H04N 21/4728
USPC ............................................................ 348/500
See application file for complete search history.

(56) References Cited

U.S. PATENT DOCUMENTS

| | | | |
|---|---|---|---|
| 6,624,846 B1 * | 9/2003 | Lassiter | G06F 3/04815 348/211.4 |
| 2009/0320073 A1 * | 12/2009 | Reisman | G06F 17/30873 725/51 |
| 2010/0146576 A1 * | 6/2010 | Costanzo | H04L 29/06027 725/117 |
| 2011/0137766 A1 * | 6/2011 | Rasmussen | G01C 21/32 705/30 |

* cited by examiner

*Primary Examiner* — Paulos M Natnael
*Assistant Examiner* — Justin Sanders
(74) *Attorney, Agent, or Firm* — Patents on Demand P.A.; Brian K. Buchheit

(57) ABSTRACT

An enhanced stream associated with a primary stream can be selected. The enhanced stream can be time-synchronized to the primary stream. The enhanced stream can be associated with a secondary viewpoint linked to a primary viewpoint of the primary stream. The primary stream can be a broadcast signal of a digital television broadcast. The enhanced stream can be simultaneously presented on a secondary device and the primary stream on a primary device. The primary device can be a computing device and the secondary device can be a computing device.

20 Claims, 8 Drawing Sheets

PLAYBACK DEVICE THAT REQUESTS AND RECEIVES A USER TAILORED VIDEO STREAM USING CONTENT OF A PRIMARY STREAM AND AN ENHANCED STREAM

CROSS-REFERENCE TO RELATED APPLICATIONS

This Application is a continuation of U.S. application Ser. No. 14/721,110 now issued as U.S. Pat. No. 9,438,937, which claims priority to U.S. Pat. No. 9,041,860 and (filed 31 May 2011) titled "Simultaneously Presenting An Enhanced And Primary Stream Associated with a Digital Television Broadcast." Each of U.S. Pat. No. 9,438,937 and U.S. Pat. No. 9,041,860 are incorporated herein by reference in its entirety.

BACKGROUND OF THE DISCLOSURE

The present invention relates to the field of digital video and, more particularly, to a video server that provides a user tailored video stream consistent with user input user content of a primary stream and an enhanced stream.

During sporting seasons, sports fans often converge in front of televisions to watch their favorite broadcasted sporting events. Ardent sports fans often watch their favorite teams from pre-season to post-season, attempting to catch every moment of sports coverage. Coverage often includes multiple cameras capturing footage which can be edited down into a single stream for broadcast. For example, coverage can include a first camera footage of a play followed by a second camera footage from a different perspective. Typically this second camera footage is often used for replays and analysis for commentators. This type of coverage is common place during sporting events, allowing fans to become immersed in the coverage by experiencing different vantage points of a game.

Fans often gather together to watch the broadcast at game-day parties in their homes when their favorite team is playing. These game-day parties often include large numbers of friends and relatives who are supporters of the playing teams. Many times, fans may want to re-watch a play which has been missed. For example, a quick trip to the restroom often results in a missed offensive play which can turn the tide of the game. Further, a fan may want to view a different version of the coverage (e.g., from a different camera angle). For example, a camera angle showing a defensive play which they missed. In these instances, fans must wait for recaps and/or replays which may or may not show missed game footage.

In many of these gatherings, fans often have mobile phones which they can frequently look up sports scores (e.g., other ongoing games) and highlights. Many of these mobile phones have significant video and audio capabilities which often go untapped. For example, many smart phones can provide video-on-demand services from sports feeds to movies. It would be beneficial to leverage these mobile device capabilities to enhance game-day experience.

DETAILED DESCRIPTION

Figure 1:
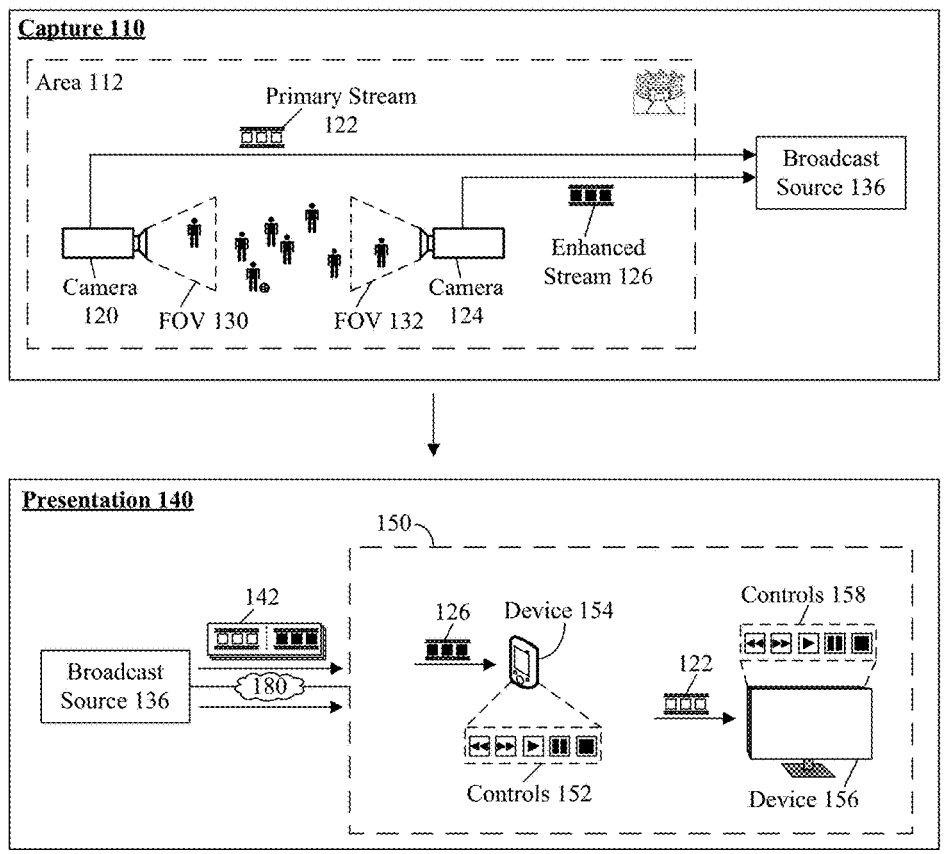
FIG. 1 is a schematic diagram illustrating a system for simultaneously presenting an enhanced and primary stream associated with a digital television broadcast in accordance with an embodiment of the inventive arrangements disclosed herein.

The present disclosure is a solution for simultaneously presenting an enhanced and primary stream associated with a digital television broadcast. In the solution, a primary stream can be associated with an aspect (e.g., field of view) of a content broadcast. The enhanced stream can be associated with a different aspect (e.g., different field of view) of the same content broadcast. The primary stream can be presented on a primary computing device. The enhanced stream can be concurrently presented on a secondary computing device. For example, the primary stream can be presented on a television and the enhanced stream can be presented on a mobile phone simultaneously. The enhanced stream can be time-synchronized to the primary stream. That is, the audio and video component of the enhanced stream and primary stream can be synchronized allowing concurrent playback. In one instance, the audio stream can be identical and the video stream can be different.

One aspect of the present invention can include a system, an apparatus, a computer program product, and a method for simultaneously presenting an enhanced and primary stream associated with a digital television broadcast. Two different video playback devices can concurrently present video to one user. The two different video playback devices can include a first playback device and a second playback device. Each of the two different video playback devices can include a screen upon which video is concurrently presented to the user. The screen of the first playback device can receive content that it presents from a primary stream of video content. At a first point-in-time the screen of the second playback device can show content approximately equivalent to what is shown on the first playback device. The second playback device can receive a user input from the user to adjust a display property on the screen of the second playback device. The video content can be presented on the screen of the first playback device is unaffected by the user input. The user input can be an input to "pan" or "zoom" the screen of the second playback device. An output presented on the screen of the second playback device can be adjusted responsive to the user input. A second point-in-time can occur after the adjusting of output responsive to the user input completes. At the second point-in-time, the screen of the second playback device cannot show content that is approximately equivalent to what is shown on the first playback device. At the second point-in-time, video content presented on the screen of the second playback device can include video content for a stitched together region that is dynamically stitched together from a first region of the primary stream and from a second region of an enhanced stream. The stitching together of video content can overcome insufficiencies in content available from the primary stream alone.

Another aspect of the present invention can include a method, an apparatus, a computer program product, and a system for simultaneously presenting an enhanced and primary stream associated with a digital television broadcast. A video can be presented on a playback device. The playback device can be a video playback device which can include a screen upon which video of an event can be presented. At a first point-in-time, the video content shown on the screen can be available within a primary stream of content. The video presentation on the screen of the playback device can be dynamically updated in response to a user input to pan. A pan operation can causes a shift-to-the-right, a shift-to-the-left, an upwards-shift, or a downwards-shift to a region shown on the video playback device. The pan operation can occur in sequential increments of distance. During the pan operation in which incremental shifts occur: a regional boundary of the primary stream of content during the pan operation can be reached; a region of the primary stream to a region from an enhanced stream together can be stitched together, responsive to reaching the regional boundary; and the spliced region can be presented as video output to the screen of the playback device. The primary stream can result from a bound region of a production space being captured by a first camera. The enhanced stream can result from a different field of view being captured by a second camera. The regions of the fields of view can be captured by the first camera and by the second camera are either substantially adjacent regions or are overlapping regions. The pan operation can be completed at a second point-in-time. The second point in time the video output shown on the playback device can be stitched from the region of the primary stream and from the region of the enhanced stream.

Yet another aspect of the present invention can include a computer program product that includes a computer readable storage medium having embedded computer usable program code. The computer usable program code can include an interface able to concurrently present video on two different video playback devices to one user. The two different video playback devices can include a first playback device and a second playback device. Each of the two different video playback devices can include a screen upon which video is concurrently presented to the user. The video can shows pictures and audio for a production event within a geographically bound area. A primary stream and an enhanced stream can be available to the different video playback devices. The primary stream can be a stream of video content that comprises camera captured content for a first field-of-view of an area. The enhanced stream can be a stream of video content that comprises camera captured content for a second field-of-view of the area. The screen of the first playback device can receive the content that it presents from the primary stream of video content. At a first point-in-time the screen of the second playback device can show content approximately equivalent to what is shown on the first playback device. The second playback device can receive a user input to adjust the second field-of-view of the area on the screen of the second playback device. The user input can cause the second field of view of the area to be shown on the second playback device to incrementally change in sequential increments of distance depending on a quantity of the user input. The video content can be presented on the screen of the first playback device can be unaffected by the user input. An output presented on the screen of the second playback device can be adjusted responsive to the user input. A second point-in-time can occur after the adjusting of the output responsive to the user input completion. At the second point-in-time, the screen of the second playback device can show a stitched region of the area. The stitched region can combine a subregion from the first field-of-view and a subregion from the second field of view. Content for the stitched region can come from dynamically stitching together portions of the primary stream and the enhanced stream.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 simultaneously presenting an enhanced and primary stream associated with a digital television broadcast in accordance with an embodiment of the inventive arrangements disclosed herein. System 100 can be associated with the context of system 200 and/or method 300. In system 100, a capture 110 stage and a presentation 140 stage can permit the concurrent presentation of linked media streams (e.g., primary stream 122, enhanced stream 126) upon multiple computing devices. In capture 110 stage, multiple cameras 120, 124 (e.g., TV cameras) can be utilized to obtain a set of media streams (e.g., stream 122, 126) which can be conveyed to a broadcast source 136. In presentation 140, streams 122, 126 can be conveyed to a set of computing devices 154, 156. For example, two viewers can watch the same TV channel different view different coverage (e.g., stream 122, 126) of a football game being played within an arena (e.g., area 112). It should be appreciated that the disclosure is distinct from traditional solutions where the disclosure can convey and present multiple media streams associated with a broadcast signal.

As used herein, the primary stream 122 can be a broadcast stream associated with a broadcast signal (e.g., signal 142). Primary stream 122 can be associated with one or more enhanced streams 126. Stream 126 can present different content which can be associated with the content of stream 122. That is, primary stream 122 and enhanced stream 126 can include different aspects of the same content. Enhanced stream 126 can be time synchronized to the primary stream 122 permitting the different aspects of the content to be viewed in tandem. For example, a viewer can watch a soccer game replay of a goal from the point of view of the goalie while another viewer can watch an alternate camera angle of the same goal at the same time.

In system 100, a capture stage 110 or presentation stage 140 can be optional. The capture stage 110 can include multiple cameras, multiple camera types, multiple capture devices, and the like. Primary stream 122 and/or enhanced stream 126 can be determined based on broadcast source, camera 120, 124, and the like. For example, primary stream 122 can be determined based on stream quality (e.g., high definition verses standard definition). Capture stage 110 can occur historically, in real-time, and/or near real-time.

In capture stage 110, an area 112 can be associated with two or more cameras 120, 124. Each camera 120, 124 can be associated with a different field of view 130, 132 respectively. For example, camera 120, 124 can capture the same sporting event from different locations within an arena. Camera 120 field of view 130 can be associated with a primary stream 122. Camera 124 field of view 132 can be associated with an enhanced stream 126. It should be appreciated that field of view 130, 132 can correspond to the extent of an observable environment by optical instruments (e.g., camera, optical components). Field of view 130, 132 can include a horizontal plane, a vertical plane and the like. Field of view 130, 132 can include an angle of view (e.g., the angular extent of a given scene that is imaged by a camera) which can be measured vertically (e.g., vertical plane), horizontally (e.g., horizontal plane), and/or diagonally (e.g., vertical and horizontal).

Camera 120, 124 can include but is not limited to, processor, image sensor, volatile memory, non-volatile memory, a bus, a shutter, and the like. Camera 120, 124 and/or optical components of camera 120, 124 properties can include, but is not limited to, depth of field, focal length, angle of view, and the like. Camera 120, 124 functionality can include, panning, zooming, and the like. In one instance, the pan/zoom functionality of the disclosure can be performed in absence of camera manipulation (e.g., pan/zoom). That is, the disclosure can utilize multiple fields of view to generate a customized enhanced stream with a user selectable video region. It should be appreciated that video region can correspond to a visible region of a video content of a stream within a screen when the stream is presented within the screen. That is, the visible region can be the area of stream content which can be visible on the screen. It should be understood that visible region can be produced by cropping and/or scaling of an enhanced stream video region. That is, visible region can be smaller than video region, in one embodiment.

In one instance, the enhanced stream 126 can be time synchronized to the primary stream 122 during the capture stage 110. Stream 122, 126 can be conveyed to broadcast source 136. It should be appreciated that stream 122, 126 can be conveyed to source 136 in real-time or near real-time.

Presentation stage 140 can occur historically and/or concurrently with capture stage 110. For example, stage 140 can transpire approximately during the same interval (e.g., accounting for broadcast delay) when capture stage 110 is a part of a live broadcast. Presentation 140 can be associated with traditional digital television programming elements including, but not limited to, a set-top box (e.g., cable box), satellite receiver, a digital television, a digital television network, a home network, computing devices (e.g., home media server, mobile phone, etc), and the like.

In presentation 140 stage, the broadcast source 136 can convey a broadcast signal 142 to computing devices 154, 156 via network 180. For example, primary stream 122 can be conveyed on a main channel and enhanced stream 126 can be conveyed on a subchannel associated with the main channel. Devices 154, 156 can concurrently playback stream 122, 126 upon receipt. In one instance, device 154, 156 can be associated with a home network 150 which can allow playback of multiple streams 122, 126 from a broadcast signal 142. In the instance, a broadcast channel associated with signal 142 can present stream 122, 126 upon device 154, 156 simultaneously. Stream 122, 126 can be time synchronized permitting identical timing playback to occur upon device 154, 156. For example, the audio of stream 122, 126 can be synchronized allowing the simultaneously presentation of different video with the same audio. In one embodiment, playback manipulation of primary stream 122 utilizing controls 158 can affect playback of stream 126. In another embodiment, playback manipulation of enhanced stream 126 via controls 152 can affect playback of stream 122.

Broadcast source 136 can include multiple broadcast sources including, but not limited to, a broadcast station, a digital television content provider, an internet protocol television (IPTV) content provider, a content provider, and the like. For example, broadcast source 136 can be associated with a digital cable service.

Stream 122, 126 can differ based on quality, formats, sizing, aspect ratio, interlacing and the like. For example, stream 122 can be an ultra high definition (e.g., QuadHD), a high definition stream and stream 126 can be a standard definition stream. Further, stream 122, 126 can differ in encoding based on target platform. For example, stream 126 can be encoded as a mobile format and delivered to a mobile phone (e.g., device 154).

In one instance, enhanced stream 126 can be conveyed to a proximate device (e.g., cable box) which can be presented upon request. Enhanced stream 126 can be accessed in a variety of user initiated and non-user initiated mechanisms. In one embodiment, an enhanced stream 126 can be selected from an on-screen menu during the presentation of a primary stream 122. For example, a program guide can present available enhanced streams 126 associated with a primary stream 122.

In one instance, stream 126 can be conveyed on-demand to a device in response to a user selection. In the instance, a content guide can present device selection capabilities of available enhanced streams associated with a primary stream. In one embodiment, a list of proximate devices can be selected from a device presenting primary stream 122. In another embodiment, an enhanced stream 126 can be selected from a proximate device. For example, an enhanced stream 126 can be a pay-per-view mobile content associated with the primary stream 122 which can be presented on a tablet computer.

Drawings presented herein are for illustrative purposes only and should not be construed to limit the invention in any regard. It should be appreciated that the disclosure can utilize a primary stream and an enhanced stream obtained from any source (e.g., pre-recorded streams). System 100 can perform time-synchronization during capture 110 and/or presentation 140 stage. System 100 can be a component of a distributed content system, distributed content delivery platform, and the like.

Figure 2:
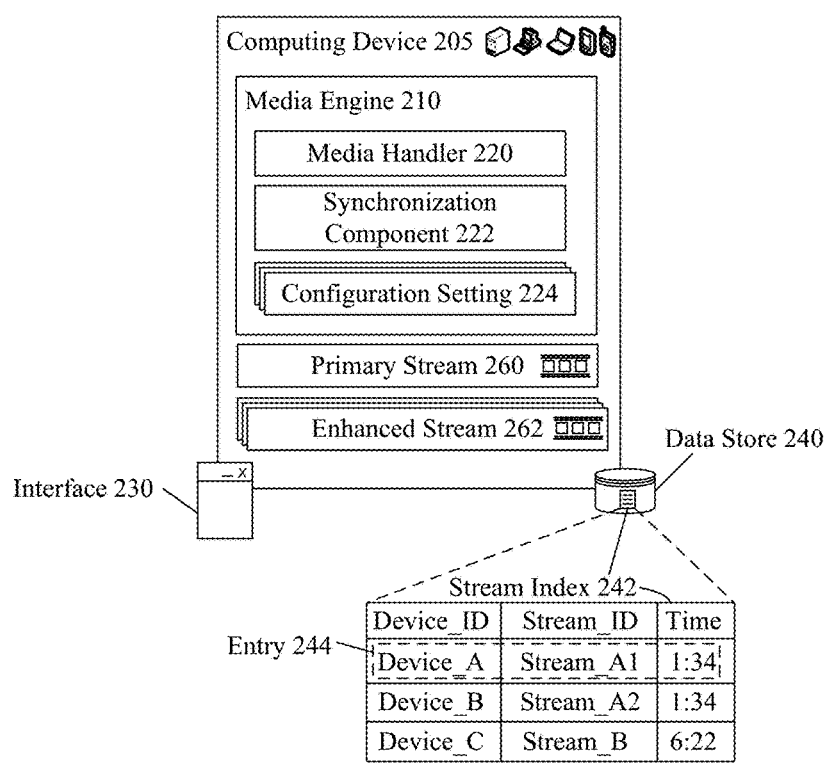
FIG. 2 is a schematic diagram illustrating a system for simultaneously presenting an enhanced and primary stream associated with a digital television broadcast in accordance with an embodiment of the inventive arrangements disclosed herein.

FIG. 2 is a schematic diagram illustrating a system 200 for simultaneously presenting an enhanced and primary stream associated with a digital television broadcast in accordance with an embodiment of the inventive arrangements disclosed herein. System 200 can be present in the context of system 100, method 300, embodiment 420, 440, 460, 500, 630, 640, 670, 710, 730, 750, method 800, and/or embodiment 910. In system 200, a stream index 242 can be utilized to synchronize and concurrently present a primary stream 260 and an enhanced stream 262. Stream index 242 can be continuously updated as stream 260, 262 is presented. In one instance, stream 260, 262 can be presented simultaneously within interface 230. Components of system 200 can be communicatively linked via one or more networks 280. It should be appreciated that system 200 can be associated with one or more communication stacks including, but not limited to, Transport Control Protocol (TCP), Internet Protocol (IP), User Datagram Protocol (UDP), Real-time Transport Protocol (RTP), and the like.

As used herein, stream 260, 262 can include an audio and/or a video element. Stream 260, 262 can conform to traditional digital television and/or Internet Protocol Television (IPTV) broadcast formats. Formats can include, but is not limited to MOVING PICTURE EXPERTS GROUP 2 (MPEG-2), MP3, Audio Codec 3 (AC-3), Advanced Audio Coding (AAC), MPEG-4, H.264/AVC, and the like. Stream 260, 262 can include pre-recorded streams, "live" streams, time-delayed broadcast streams, and the like. Stream 260, 262 can be stored within media engine 210, data store 240, and the like. Stream 260, 262 can include a video region 261, 264 which can define the dimensions of the viewable area of the stream. For example, region 261, 264 can be defined by aspect (e.g., standard, wide screen), pixel resolution (e.g., 1920×1080), and the like. Region 261, 264 can be associated with scaling, compression, and the like. It should be appreciated that the high definition television standards defined by the Advanced Television Systems Committee (ATSC) can produce wide screen 16:9 images up to 1920×1080 pixels in size. However, many different image sizes are also supported. The reduced bandwidth requirements of lower-resolution images allow up to six standard-definition "subchannels" to be broadcast on a single 6 MHz TV channel.

Server device 205 can be a hardware/software element for executing media engine 210. Device 205 functionality can include, but is not limited to, data sharing, hardware/software resource allocation, load balancing, encryption, and the like. Server 205 can operate within a client-server architecture. In one instance, server 205 can execute applications (e.g., server application) which can serve the requests of other programs (e.g., clients). Typical computing servers can include a database server, a file server, a mail server, a print server, a web server, a gaming server, and an application server. For example, numerous systems use client server networking model including Web sites and email servers (e.g., and/or services). An alternative model to the client-server model, the peer-to-peer networking can enables a computing device to function as either a server or client as needed. In one instance, device 205 can execute a Web server application (e.g., APACHE Web server). In one embodiment, device 205 can operate within a networked computing environment, Cloud computing environment, and the like. Device 205 can include, but is not limited to, an interface 230, a data store 240, a CPU, a volatile memory, a non-volatile memory, a bus, and the like. Device 205 operating system can include, but is not limited to, UNIX, LINUX, WINDOWS, and the like. In one embodiment, device 205 can operate as a streaming audio and video server. In the embodiment, device 205 can receive primary stream 260 and/or enhanced stream 262 from a broadcast system 270 and convey the streams 260, 262 to client device 280.

Media engine 210 can be a hardware/software component for managing stream 260, 262 synchronization and/or presentation. Engine 210 functionality can include, but is not limited to, stream buffering, request negotiation, authentication, and the like. Engine 210 can be a distributed component communicatively linked to one or more playback and/or presentation devices. Engine 210 can be a component of a content delivery platform, a set-top box, a television, a mobile computing device, and the like. In one instance, engine 210 can be a component of an application programming interface (API). In another instance, engine 210 can be a feature of a media plug-in of a media player.

Media handler 220 can be a hardware/software element configured to manage stream 260, 262. Handler 220 functionality can include, but is not limited to: encryption/decryption, encoding/decoding, and the like. Handler 220 can utilize index 242 to process stream requests from one or more computing devices. For example, entry 255 can track a Stream_A1 stream request from a Device A device. Handler 220 can execute in real-time and/or near real-time. In one instance, handler 220 can perform digital video recording functionality. For example, handler 220 can record a primary stream and three associated enhanced streams to data store 240.

Synchronization component 222 can be a hardware/software entity for synchronizing enhanced stream 262 with primary stream 260. Component 222 functionality can include, frame skipping capabilities, real-time editing functions, playback capabilities, and the like. Component 222 can synchronize audio and/or video elements of streams 260, 262. In one instance, component 222 can utilize index 242 to track timing parameters of streams 260, 262 during playback. In the instance, component 222 can update index 242 in real-time or near real-time. In one instance, component 222 can be utilized to synchronize enhanced stream 262 when video region 264 changes.

Payment component 226 can be a hardware/software element for enable pay-per-use and/or pay-per-view access to stream 260, 262. In one instance, component 226 can be utilized for billing customers, tracking stream 262 viewing, and the like. In the instance, component 226 can utilize unique identifiers (e.g., user identifier, device identifier) to perform the functionality described herein. In one embodiment, payment component 226 can be triggered when enhanced stream 262 is requested, a zoom function is performed, a pan function is performed, and the like. In one instance, component 226 functionality can integrated within client device 280, server 205, broadcast system 270, and the like. In one embodiment, component 226 can be utilized to permit access to stream 262 on a secondary screen (e.g., on a different device) while a primary device (e.g., client 280) is presenting primary stream 260. For example, component 226 can be utilized to provide a user with access to view enhanced stream 262 during a pay-per-view event for an upcharge cost (e.g., additional $3.99 per stream). In one embodiment, component 226 can be integrated into payment gateways, billing systems, metric tracking systems, and the like.

Configuration setting 224 can be one or more parameters for establishing the behavior of system 200. Setting 224 can include, but is not limited to, handler 220 settings, component 222 configuration, and the like. Setting 224 can be stored within engine 210, data store 240, and the like. Setting 224 can include user configured settings, content provider established parameters, stream 260, 262 settings, index 242 settings, and the like.

Field of view (FOV) mapping 266 can be one or more data sets for mapping a field of view 274 from cameras 272 to a video region 261, 264. In one embodiment, mapping 266 can be a one to one mapping based on the dimensions of camera optics components and device 280 screen. In the embodiment, the mapping 266 can permit the field of view width and height to be linked to the device 280 screen width and height to enable zoom/pan operations. For example, mapping 266 can map a 1920×1080 resolution of an ATSC Standard A/53 Part 4 MPEG-2 encoded stream (e.g., stream 262) to a 1920×1080 resolution of screen of a MICROSOFT SURFACE tablet computing device. It should be appreciated that mapping 266 can permit arbitrarily complex mappings of video region 261, 264 to field of view 274 and is not limited to a one-to-one mapping (e.g., 1920×1080 to 2560× 1440). In one embodiment, mapping 266 can enable input parameters (e.g., distance, quantity) associated with pan/zoom operations to be mapped to a real world field of view. For example, when a zoom operation is performed with a pinch zoom gesture, the amount of distance between the fingers (e.g., one inch) can be utilized determine an appropriate zoom change in field of view 274 (e.g., 20 millimeters). It should be appreciated that mapping 266 can enable rapid acquisition of appropriate video for stream 262 (e.g., via camera 272 TTL information, broadcast system metadata, and the like).

For example, when a pan operation moves the video region 264 outside the field of view 274 associated with stream 262, a new field of view 274 can be computed and an appropriate video region 264 can be stitched together and conveyed within stream 262. It should be appreciated that the disclosure is not limited to this functionality.

Index 242 can be one or more data sets for maintaining synchronization and/or playback of stream 260, 262. Index 242 can include, but is not limited to, device identifier, stream identifier, timing values, security settings, and the like. For example, index 242 can include entry 244 which can track multiple devices, multiple streams, and synchronization parameters. It should be appreciated that index 242 can be an optional component of system 200.

Interface 230 can be a user interactive component permitting interaction with a media engine and/or stream 260, 262. Interface 230 can be a graphical user interface (GUI), voice user interface (VUI), mixed-mode interface, touch sensitive interface, and the like. In one instance, interface 230 can present stream 262 in response to a presentation of stream 260 upon a computing device. Interface 230 can be communicatively linked to computing device 205.

Data store 240 can be a hardware/software component able to store stream index 242. Data store 240 can be a Storage Area Network (SAN), Network Attached Storage (NAS), and the like. Data store 240 can conform to a relational database management system (RDBMS), object oriented database management system (OODBMS), and the like. Data store 240 can be communicatively linked to computing device 204 and/or media engine 210 in one or more traditional and/or proprietary mechanisms.

As used herein, a client device 280 can be a hardware/software entity for presenting primary stream 260 and/or enhanced stream 262. Client device 280 can include, but is not limited to, a laptop computer, a mobile phone, a tablet computing device, a multimedia device, and the like. Device 280 can include, but is not limited to, input/output (I/O) components 282, interface 286, and the like. I/O components 282 can include, but is not limited to, a keyboard, a loudspeaker, a touchscreen, a camera, a microphone, and the like. Device 280 can receive one or more input comments via components 282 which can trigger the execution of programmatic code. In one embodiment, interface 286 can be a user interactive graphical user interface (GUI), a Voice User Interface (VUI), a multi-modal interface, and the like. In one instance, interface 286 can present stream 260 and/or enhanced stream 262.

Broadcast system 270 can be a hardware/software entity for obtaining and/or conveying stream 260 and/or enhanced stream 262. System 270 can include, but is not limited to, cameras 272, transmission equipment (e.g., antennas), networks, and the like. For example system 270 can be an Advanced Television Systems Committee (ATSC) digital television broadcast system associated with a major television network such as National Broadcasting Company (NBC). It should be appreciated that broadcast system 270 can include a broadcast signal which can include primary stream 260 and/or enhanced stream 262.

Network 280 can be an electrical and/or computer network connecting one or more system 200 components. Network 280 can include, but is not limited to, twisted pair cabling, optical fiber, coaxial cable, and the like. Network 280 can include any combination of wired and/or wireless components. Network 280 topologies can include, but is not limited to, bus, star, mesh, and the like. Network 280 types can include, but is not limited to, Local Area Network (LAN), Wide Area Network (WAN), Virtual Private Network (VPN) and the like.

Drawings presented herein are for illustrative purposes only and should not be construed to limit the invention in any regard. System 200 can be associated with one or more content delivery protocols and/or network protocols. Protocols can include, but are not limited to, Internet Protocol (IP), Transmission Control Protocol (TCP), Real-time Streaming Protocol (RTSP), Real-time Transport Protocol (RTP), and the like.

Figure 3:
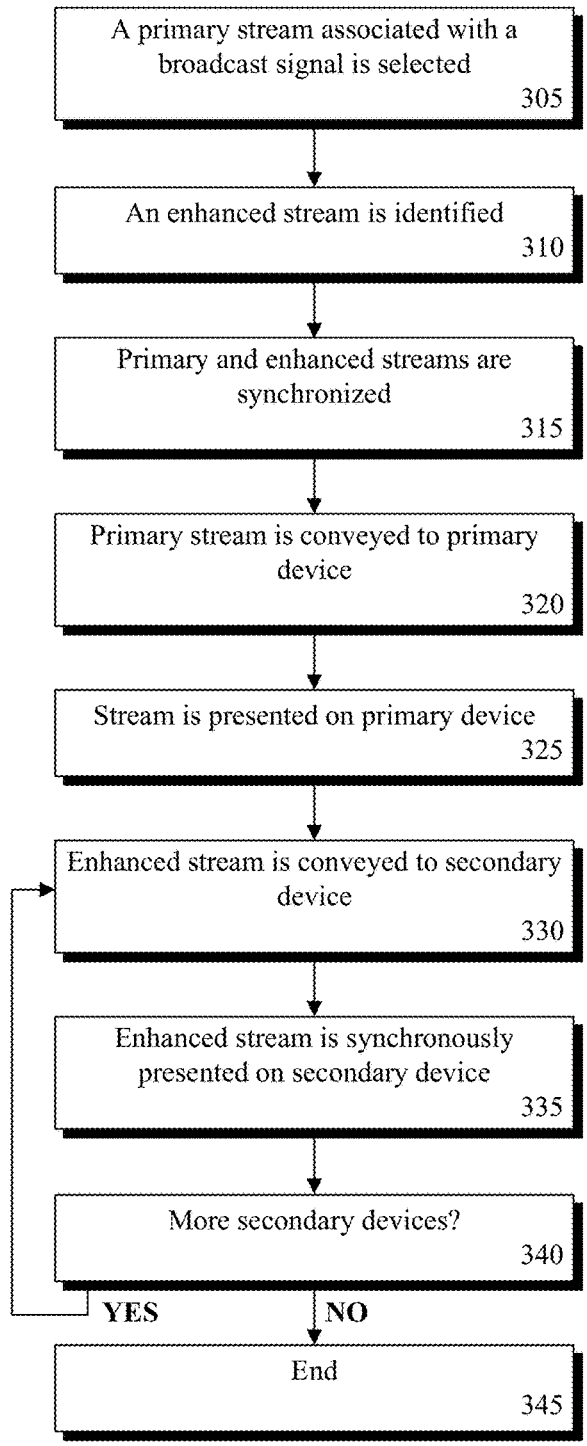
FIG. 3 is a schematic diagram illustrating a method for simultaneously presenting an enhanced and primary stream associated with a digital television broadcast in accordance with an embodiment of the inventive arrangements disclosed herein.

FIG. 3 is a schematic diagram illustrating a method 300 for simultaneously presenting an enhanced and primary stream associated with a digital television broadcast in accordance with an embodiment of the inventive arrangements disclosed herein. Method 300 can be present in the context of system 100, system 200, embodiment 420, 440, 460, 500, 630, 640, 670, 710, 730, 750, method 800, and/or embodiment 910. In method 300, a primary and enhanced stream can be communicated to a primary device and a secondary device. The primary and secondary device can present the streams concurrently enabling two or more different aspects of a broadcast content to be viewable.

In step 305, a primary stream associated with a broadcast signal can be selected. The primary stream can be automatically selected based on broadcast content provider management. For instance, the primary stream can be a movie being broadcast according to a program schedule. In step 310, an enhanced stream is identified. The enhanced stream can be identified automatically and/or manually. In one instance, a viewer can select an enhanced stream associated with the primary stream. In the instance, information associated with the enhanced stream can be presented, enabling a viewer to decide on enhanced stream selection. In step 315, primary and enhanced streams can be synchronized. The synchronization can be performed automatically based on the enhanced stream selection.

In step 320, the primary stream can be conveyed to a primary device. In step 325, the primary stream can be presented upon the primary device. In step 330, the enhanced stream can be conveyed to the secondary device. In step 335, the enhanced stream can be synchronously presented upon the secondary device. In step 340, if more secondary devices are available, the method can return to step 330, else continue to step 345. In step 345, the method can end.

Drawings presented herein are for illustrative purposes only and should not be construed to limit the invention in any regard. Method 300 can continuously execute steps 305-340 as a primary stream selection is modified.

Figure 4A:
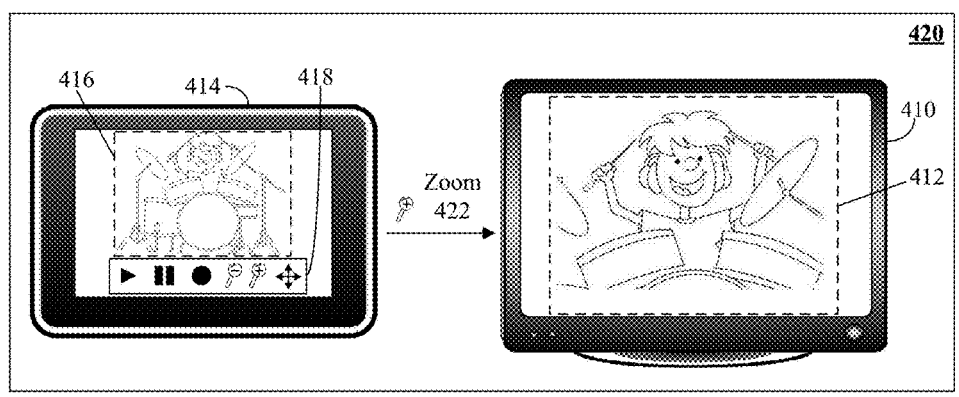
FIG. 4A is a schematic diagram illustrating a set of embodiments for simultaneously presenting an enhanced and primary stream associated with a digital television broadcast in accordance with an embodiment of the inventive arrangements disclosed herein.
Figure 4A:
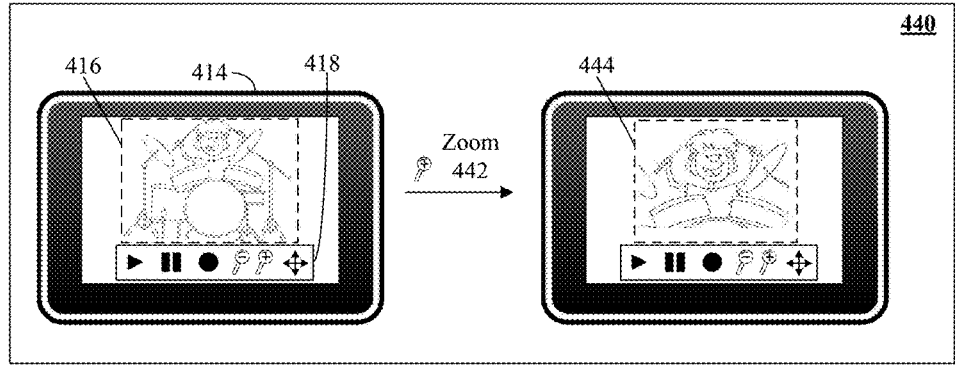

FIG. 4A is a schematic diagram illustrating a set of embodiments 420, 440 for simultaneously presenting an enhanced and primary stream associated with a digital television broadcast in accordance with an embodiment of the inventive arrangements disclosed herein. Embodiments 420, 440 can be present in the context of system 100, 200, method 300, embodiment 460, 500, 630, 640, 670, 710, 730, 750, method 800, and/or embodiment 910. Embodiments 420, 440 can include a primary device 410 and a secondary device 414. Primary device 410 can present primary stream 412 and secondary device 414 can present enhanced stream 416. In embodiment 420, a zoom functionality enacted upon device 414 can affect stream 412 presented upon primary device 410. That is, device 410 can perform control capabilities commonly present in remote controls (e.g., television remote control). In embodiment, 440, a zoom functionality enacted upon device 414 can affect enhanced stream 416 presented upon device 414.

In one configuration of the embodiment 420, secondary device 414 can include controls 418. Controls 418 can include on-screen controls, physical button controls, and the like. Controls 418 can include playback controls (e.g., play, pause), stream manipulation controls (e.g., pan, zoom), and the like. Upon selection of a zoom functionality from controls 418, zoom 422 command can be conveyed to primary device 412. Zoom 422 command can alter the presentation of stream 412 causing a zoom functionality to be executed. For example, a user can utilize tablet 414 to cause a portion of primary stream 412 to become twenty percent larger.

In one configuration of embodiment 440, a zoom action initiated upon secondary device via controls 418 can affect playback of enhanced stream 416. A primary stream (e.g., primary stream 412) associated with the enhanced stream 416 can be unaffected. Zoom functionality associated with controls 418 can be dynamic and/or static. For example, a lasso tool can be utilized to dynamically scale a user selected area.

Drawings presented herein are for illustrative purposes only and should not be construed to limit the invention in any regard. It should be appreciated that embodiments 420, 440 can include any playback controls and/or stream modification controls including, but not limited to, pan, zoom, rotate, aspect transform, visual filters, audio filters, and the like.

Figure 4B:
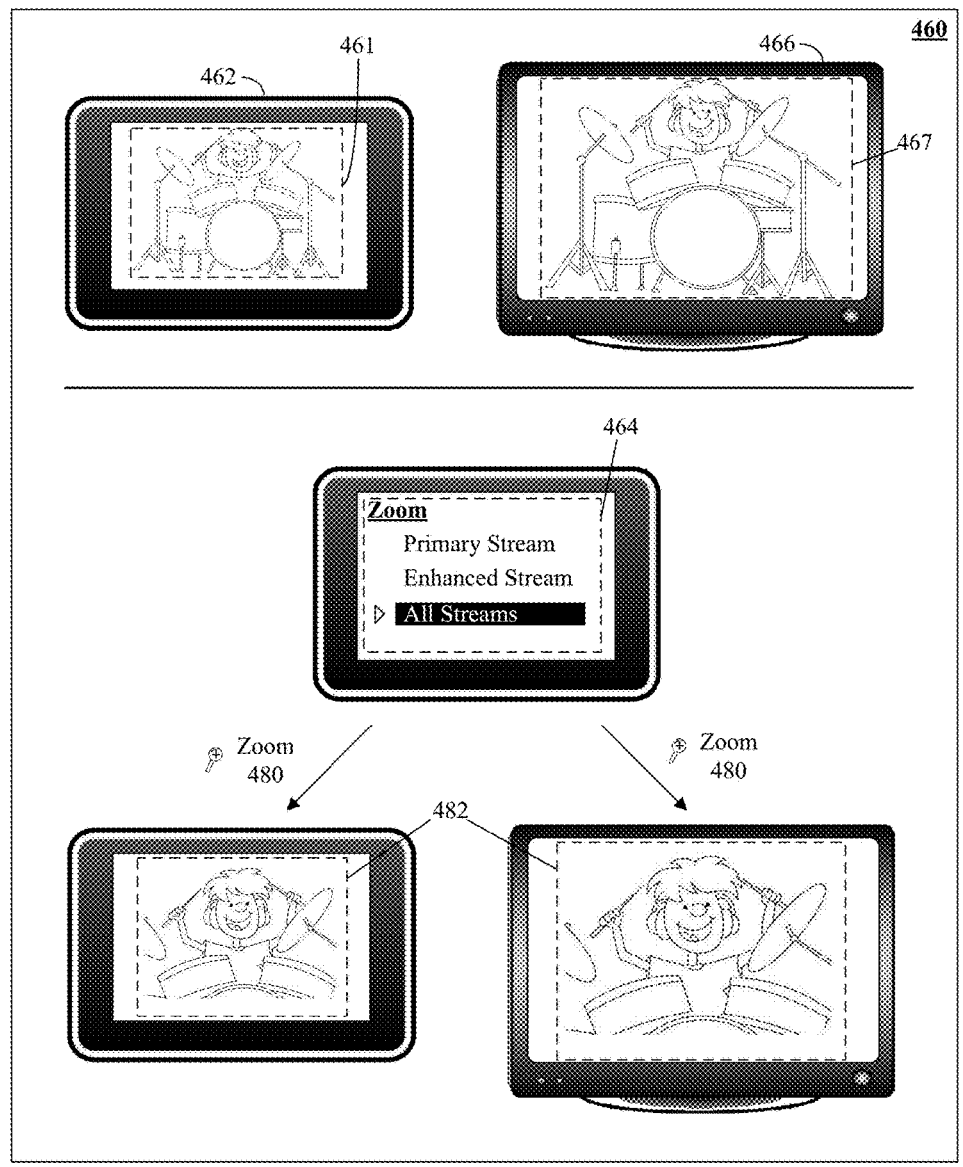
FIG. 4B is a schematic diagram illustrating an embodiment for simultaneously presenting an enhanced and primary stream associated with a digital television broadcast in accordance with an embodiment of the inventive arrangements disclosed herein.

FIG. 4B is a schematic diagram illustrating an embodiment 460 for simultaneously presenting an enhanced and primary stream associated with a digital television broadcast in accordance with an embodiment of the inventive arrangements disclosed herein. Embodiment 460 can be present in the context of system 100, 200, method 300, embodiment 420, 440, 500, 630, 640, 670, 710, 730, 750, method 800, and/or embodiment 910. In embodiment 460, an on-screen menu 464 can permit a zoom functionality to be enacted upon a primary stream 467 and one or more enhanced streams 461. Primary stream 467 and enhanced stream 461 can be presented upon device primary device 466 and secondary device 462 concurrently. On-screen menu 464 can be presented in response to a user initiated action. For example, menu 464 can be presented when a user double taps the viewing area of tablet 464 during stream 461 playback. It should be appreciated that menu 464 can be presented via user initiated gestures (e.g. pinch, drag).

In one configuration of embodiment 460, on-screen menu 464 can be a selection menu allowing zooming functionality upon a primary stream 467 and enhanced stream 461 in real-time. Responsive to a selection of menu item within menu 464, a zoom 480 command can be conveyed to relevant devices. For example, menu 464 can permit a pre-defined zoom in functionality to be applied to stream 467 and enhanced stream 461. Region 482 can be presented upon device 462, 466 upon receipt of command 480. It should be appreciated that region 482 can be similar based on stream 461, 467 aspect ratios, encoding, fidelity, and the like.

Drawings presented herein are for illustrative purposes only and should not be construed to limit the invention in any regard. It should be appreciated that error handling can be associated with the embodiment 420, 440, 460. For example, if playback is interrupted, an appropriate error can be presented, indicating a failure to manipulate stream playback.

Figure 5:
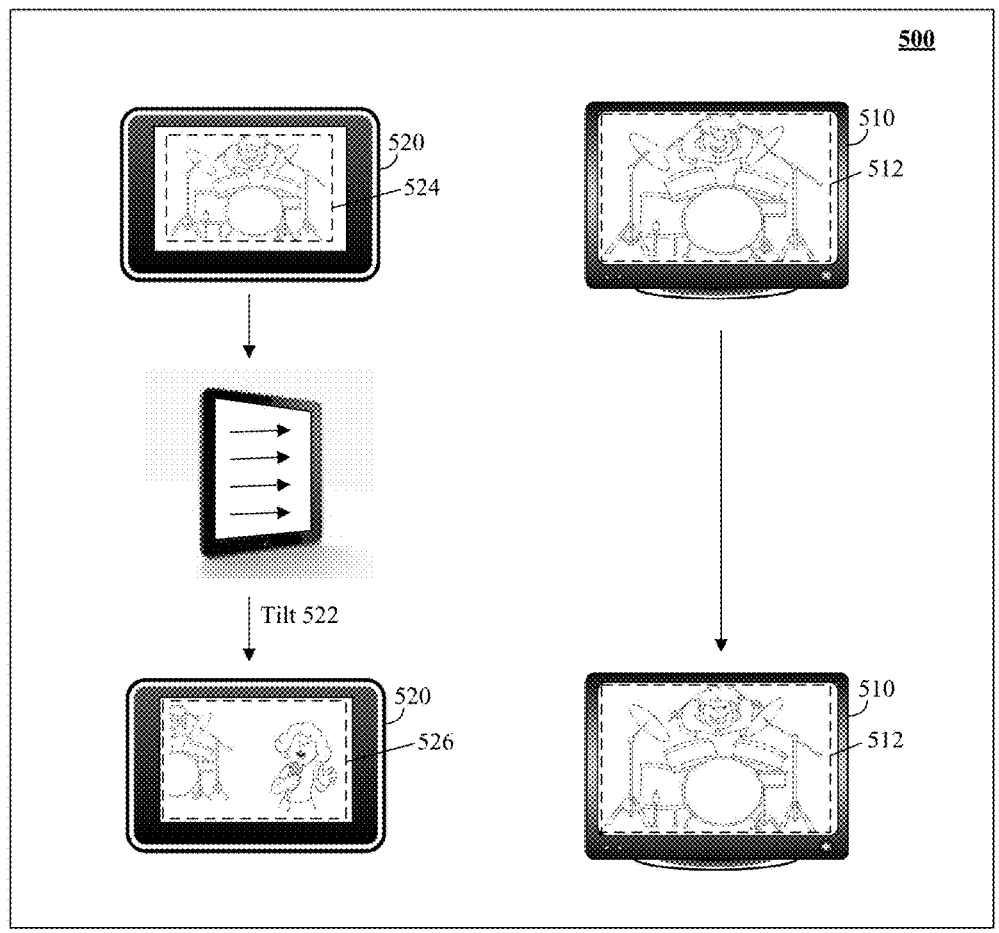
FIG. 5 is a schematic diagram illustrating an embodiment for simultaneously presenting an enhanced and primary stream associated with a digital television broadcast in accordance with an embodiment of the inventive arrangements disclosed herein.

FIG. 5 is a schematic diagram illustrating an embodiment 500 for simultaneously presenting an enhanced and primary stream associated with a digital television broadcast in accordance with an embodiment of the inventive arrangements disclosed herein. Embodiment 500 can be present in the context of system 100, 200, method 300, embodiment 420, 440, 460, 630, 640, 670, 710, 730, 750, method 800, and/or embodiment 910. In embodiment 500, primary stream 512 can be presented on primary device 510 and enhanced stream 524 can be presented on secondary device 520. Secondary device 520 can be used to manipulate stream utilizing motion input received from a user action. For example, a user can tilt tablet 520 to pan in any direction of an enhanced stream 524.

In one configuration of embodiment 500, secondary device 520 can include motion input capabilities (e.g., accelerometer) which can be mapped to stream modification functionality. For example, tilting the tablet (e.g., along the z-axis) to the right can pan the stream to the right presenting portion 526 of stream 524. In one instance, stream 512 can be unaffected by changes in stream 524.

Drawings presented herein are for illustrative purposes only and should not be construed to limit the invention in any regard. It should be understood that motion input able to manipulate stream can include, shaking, rotating, and the like. Further, motion input can be received from accessory devices including game controllers, remote controls, and the like.

Figure 6:
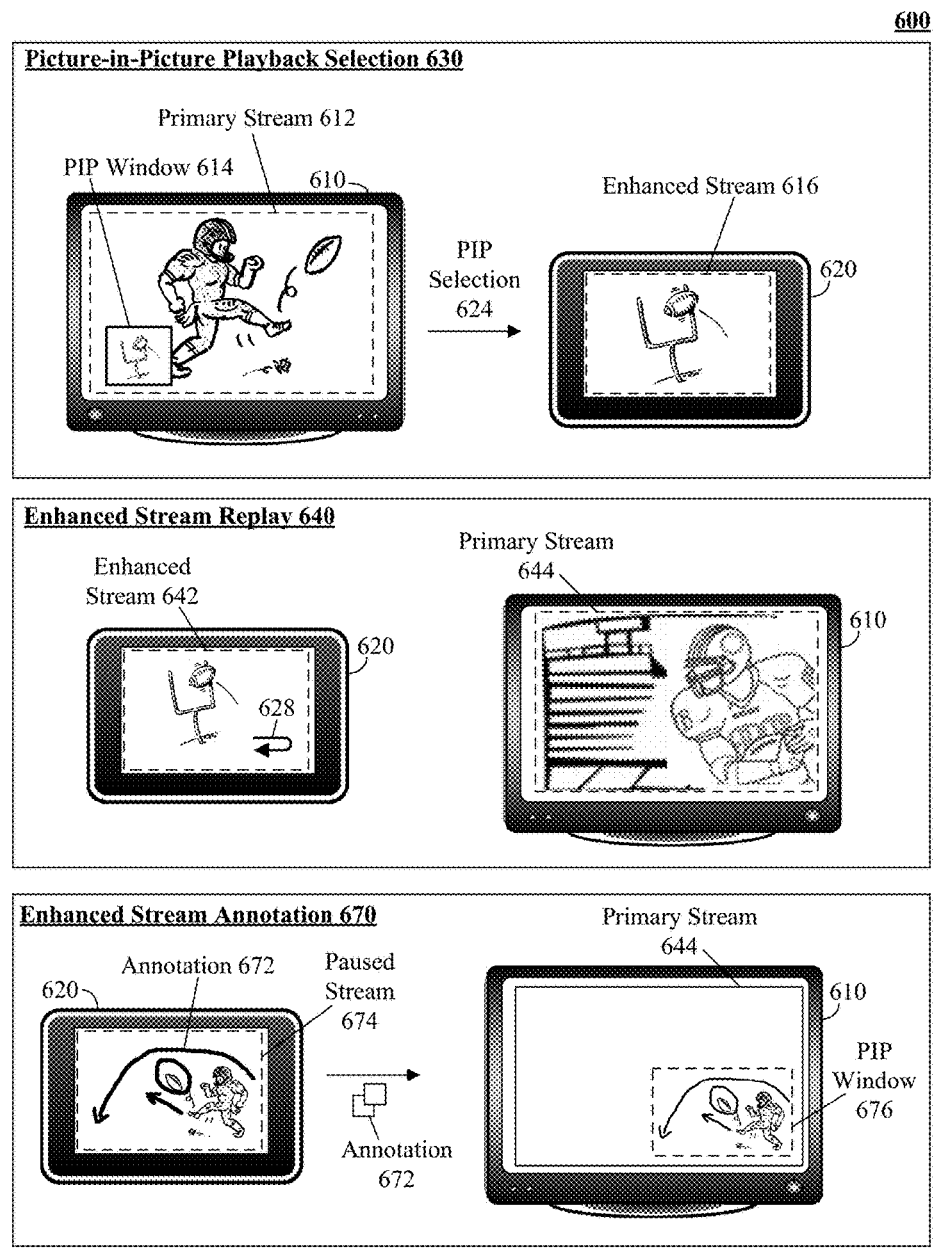
FIG. 6 is a schematic diagram illustrating a series of embodiments for simultaneously presenting an enhanced and primary stream associated with a digital television broadcast in accordance with an embodiment of the inventive arrangements disclosed herein.

FIG. 6 is a schematic diagram illustrating a series of embodiments 630, 640, 670 for simultaneously presenting an enhanced and primary stream associated with a digital television broadcast in accordance with an embodiment of the inventive arrangements disclosed herein. Embodiment 630, 640, 670 can be present in the context of system 100, 200, method 300, embodiment 420, 440, 460, 500, 710, 730, 750, method 800, and/or embodiment 910. In embodiment 630, a picture-in-picture (PIP) window 614 presenting an enhanced stream can be dynamically presented upon device 620 as enhanced stream 616. In embodiment 640, an enhanced stream 642 replay can be performed without affecting associated primary stream 644 playback. In embodiment 670, user-created annotations within a paused stream 674 (e.g., "frozen" enhanced stream) can be conveyed from a secondary device 620 to a primary device 610.

In one configuration of embodiment 630, enhanced stream 616 can be automatically presented on device 620 when a picture-in-picture window functionality is activated. In another configuration of embodiment 630, enhanced stream 616 can be presented upon user selection. For example, a media player application executing upon device 620 can permit user selection (e.g., PIP selection 624) of PIP window 614 content. In one instance, as PIP content changes, enhanced stream 616 can dynamically change.

In embodiment 640, an enhanced stream 642 can be repeatedly presented (e.g., looped) without affecting primary stream 644 playback via replay element 628 (e.g., control button overlay). In one instance, replay can be dynamically customized to user preferences. For example, a film strip can be presented of an enhanced stream 642 to permit user selection of replay content. Enhanced stream 642 can be a portion of primary stream 644, an enhanced stream and a primary stream, and the like.

In one configuration of embodiment 670, one or more annotations 672 can be created within a paused stream 674. Paused stream 674 can be an enhanced stream and/or a primary stream. Paused stream 674 can be a user selected frame from a stream presented on device 620. Annotation 672 can include, but is not limited to text, polygons (e.g., circles, squares), freehand drawing, and the like. In one instance, annotation 672 can be conveyed to a picture-in-picture window 676 of a primary device 644.

In one embodiment, stream 672 manipulation can be enacted independently of stream 644. In the embodiment, manipulation can include annotations, picture freeze, zoom, pan, rotate, and the like. For example, visual overlay tools such as text tools, polygon tools, and freehand drawing tools can be presented during a paused stream 672, allowing a user to annotate the frame.

Drawings presented herein are for illustrative purposes only and should not be construed to limit the invention in any regard. In one instance, device 620 can "push" stream 616 to device 610. In one configuration of the instance, device 620 can select PIP window 614 content which can be presented in PIP window 614. In another configuration of the instance, device 620 can select primary stream 612 which can be presented in device 610. In yet another configuration of the instance, content not associated with the primary stream 612 and enhanced stream 616 can be exchanged. For example, annotations created on device 620 associated with stream 616 can be conveyed and presented on device 610.

In one configuration of the embodiment 630, picture swapping capabilities can be present. For example, stream 612 can be swapped with stream 616 resulting in stream 616 presented on device 610 and stream 612 presented on device 620.

Figure 7:
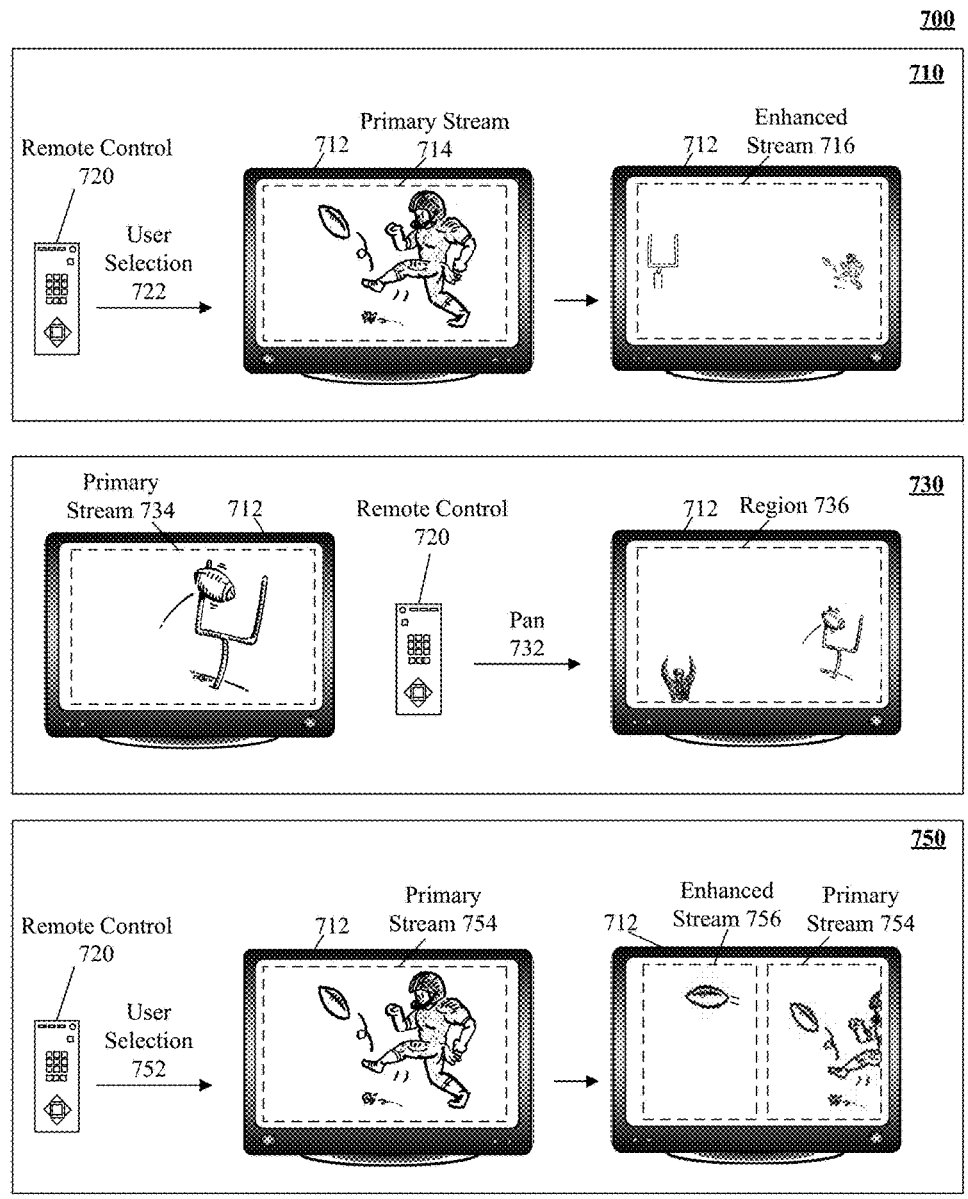
FIG. 7 is a schematic diagram illustrating a series of embodiments for simultaneously presenting an enhanced and primary stream associated with a digital television broadcast in accordance with an embodiment of the inventive arrangements disclosed herein.

FIG. 7 is a schematic diagram illustrating a series of embodiments 710, 730, 750 for simultaneously presenting an enhanced and primary stream associated with a digital television broadcast in accordance with an embodiment of the inventive arrangements disclosed herein. Embodiments 710, 730, 750 can be present in the context of system 100, 200, method 300, embodiment 420, 440, 460, 500, 630, 640, 670, method 800, and/or embodiment 910. In embodiments 710, 730, 750, a television remote control 720 can be employed to interact with primary and enhanced streams presented upon device 712. In embodiment 710, a remote control 720 can be utilized to select an enhanced stream 716 associated with a primary stream 714 presented on device 712. In embodiment 730, a remote control 720 can be utilized to pan a primary stream to present region 736 of an enhanced stream. In embodiment 750, a remote control 720 can permit presentation of a primary stream 754 and enhanced stream 756 concurrently on device 712.

In one configuration of embodiment 710, a user selection via remote 720 can present an enhanced stream 716 which can include content allowing zoom in/out capabilities to be performed. For instance, up and down arrow keys on remote 720 can allow a user to zoom in and out of an enhanced stream 716. In one instance, enhanced stream 716 can include a wider field of view than primary stream 714. In the instance, a user selection 722 can present an enhanced stream which can be a widescreen formatted version of primary stream 714.

In one configuration of embodiment 730, a user selection via remote 720 can trigger an enhanced stream to be presented following a primary stream 734 presentation. In the configuration, an enhanced stream region 736 can be presented in response to a pan 732 action when primary stream 734 lacks sufficient content. It should be appreciated that embodiment 730 can be enacted for any user-initiated action including zoom, replay, and the like.

In one configuration of embodiment 750, a user selection 752 can present primary stream 754 and enhanced stream 756 simultaneously on device 712. In one instance, stream 754, 756 can be dynamically stitched together to permit user interactions described herein. In one configuration of embodiment 750, remote control 720 can be utilized to interact with stream 754, 756, and the stitched stream.

The flowchart and block diagrams in the FIGS. 1-7 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be appreciated that the disclosure herein is able to be implemented in a plurality of manners as understood by one of ordinary skill. For example, in one embodiment, a video server (such as server device 205, or a derivative thereof) comprising hardware and software conveys video over a network to be played on a plurality of user playback devices (such as client device 280 or a derivative thereof). The video comprising media content of a geographic area (such as area 112 or a derivative thereof) which is concurrently covered by a first camera (such as camera 120, or a derivative thereof) that captures a first portion of the geographic area in a first field of view (such as FOV 130, or a derivative thereof) and by a second camera (such as camera 124, or a derivative thereof) that captures a second portion of the geographic area in a second field of view (such as FOV 132, or a derivative thereof), wherein an overlapping area exists. The first portion includes the overlapping area and a first non-overlapping area. The second portion includes the overlapping area and a second non-overlapping area. A primary stream (such as stream 122 or a derivative thereof) of video content corresponds content including the overlapping area and the first non-overlapping area. An enhanced stream (such as stream 126 or a derivative thereof) of video content corresponds to content including the overlapping area and the second non-overlapping area. The video server receives a user input for user tailored video to be delivered to a user playback device (such as device area 154, 156, 280, 410, 414, 462, 466, 510, 520, 610, 620, 712, or a derivative thereof), which is one of the user playback devices. The user input is an input for an adjustment to shift-to-the right, to shift-to-left, to upwards-shift, or to downwards-shift video content shown on a screen of the user playback device. At a time the user input was received the screen showed video content that did not include content from both the first portion and the second portion. The adjustment as specified by the user input would result in playback video that shows at least part of the first portion, the overlapping area, and at least part of the second portion. Responsive to receipt of the user input, the video server dynamically creates a user tailored video stream consistent with the user input. The dynamically creating of the user tailored video stream stitches a region of the primary stream to a region from the enhanced stream together to produce the user tailored video stream comprising the at least part of the first portion, the overlapping area, and the at least part of the second portion. Responsive to the dynamically creating, the video server conveys over the network the user tailored video stream to the user playback device. The user playback device in receipt of the user tailored video stream is able to present the user tailored video stream that shows the at least part of the first portion, the overlapping area, and the at least part of the second portion consistent with the user input. In embodiments, the primary stream, the enhanced stream, and the user tailored video stream are time synchronized to each other. In embodiments, the primary stream is conveyed from the video server to a first video playback device of a user from which the user input was received. The user tailored video stream is concurrently conveyed from the video server to the user playback device, which is a second device of the user in embodiments. Playback of the primary stream presented on the first video playback device is time synchronized with playback of the user tailored video stream of the user playback device. In embodiments, the primary stream is a broadcast stream of an event that is broadcasted by a broadcast source providing video coverage for the event. In embodiments, the user input is a portion of a continuous input to "pan" or "zoom" the screen in sequential increments of distance over time. As such, input is a continuous input comprising a first distance input at a first time, a second distance input at a second time, and a third distance input at a third time. The adjustment represents a shifting of the first distance at the first time—the receiving of the user input, the dynamically creating, and the conveying steps are repeated for the second distance input and for the third distance input. In embodiments, the user input is an input to pan the screen. In embodiments, the user input is an input to zoom the screen. In embodiments, the primary stream and the enhanced stream comprise video for a live event being concurrently captured by the first camera and the second camera. In embodiments, different user inputs are concurrently submitted to the video server by different users via the plurality of user playback devices, which results in the video server customizing user specific video streams per the different user inputs for the different users for playback on the plurality of user playback device. In embodiments, the stitched together region is a continuous video region stitched together along a horizontal or vertical plane. In embodiments, throughout the method, an audio output from the user playback device is substantially unaffected and is able to be audibly presented via the user playback device without substantial interruption. In embodiments, the video server includes at least one processor, at least one non-transitory memory storing program instructions. In embodiments, the video server streams and time-synchronizes a primary stream, an enhanced stream, and user tailored streams of video to a plurality of user playback devices. In embodiments, execution of the program instructions by the processor results in the video server performing steps of the described method presented herein. In embodiments, the user input is to pan. In embodiments, a pan operation causes a shift-to-the-right, a shift-to-the-left, an upwards-shift, or a downwards-shift to a region shown on the video playback device. In embodiments, the pan operation occurs in sequential increments of distance, wherein at a time the user input was received the screen showed video content that did not include content from both the first portion and the second portion. In embodiments, an adjustment to pan as specified by the user input would result in playback video that shows at least part of the first portion, the overlapping area, and at least part of the second portion. In embodiments, responsive to receipt of the user input, the video server dynamically creating a user tailored video stream consistent with the user input, wherein the dynamically creating of the user tailored video stream upon which a pan operation is represented. In embodiments, during the pan operation in which incremental shifts occur: a regional boundary of the primary stream of content is reached during the pan operation; responsive to reaching the regional boundary, a region of the primary stream is stitched to a region from an enhanced stream; and a resulting spliced region is created as video output. In embodiments, responsive to the dynamically creating, the video server conveys the user tailored video stream over the network to the user playback device, whereby the user playback device in receipt of the user tailored video stream is able to present the user tailored video stream that shows the at least part of the first portion, the overlapping area, and the at least part of the second portion consistent with the user input and that shows results of the pan operation as video output consistent with the user input to pan.

The following claims are to be interpreted in light of the specification. As such, terms within the claims are to be explicitly interpreted as (and to be constrained in scope to) being directed to statutory subject matter falling within the boundaries of 35 USC 101, which are limitations that the following claims are constrained to. Any interpretations of the claims exceeding these intended boundaries are explicitly interpretations extending past the broadest reasonable interpretation of the claims in light of this specification as defined herein. That is, any embodiments outside the scope of 35 USC 101 are expressly not included within scope of the claims herein.

What is claimed is:

1. A method comprising:
   receiving, at a playback device comprising hardware and software, video over a network from a video server, said video comprising media content of a geographic area which is concurrently covered by a first camera that captures a first portion of the geographic area in a first field of view and by a second camera that captures a second portion of the geographic area in a second field of view, wherein an overlapping area exists, wherein the first portion includes the overlapping area and a first non-overlapping area, wherein the second portion includes the overlapping area and a second non-overlapping area, wherein a primary stream of video content corresponds content including the overlapping area and the first non-overlapping area, wherein an enhanced stream of video content corresponds to content including the overlapping area and the second non-overlapping area;
   conveying to the video server from the playback device, a user input for user tailored video to be delivered to the playback device, wherein the user input is an input for an adjustment to shift-to-the right, to shift-to-left, to upwards-shift, or to downwards-shift video content shown on a screen of the user playback device, wherein at a time the user input was conveyed the screen showed video content that did not include content from the second non-overlapping area but did include content from the first portion, wherein the adjustment as specified by the user input would result in playback video that shows at least part of the second non-overlapping area from the second portion, at least part of the overlapping area, and at least part of the first non-overlapping area from the first portion;
   in response to the conveying of the user input, receiving at the playback device the user tailored video from the video server, wherein the user tailored video per the adjustment comprises at least part of the second non-overlapping area from the second portion, the at least part of the overlapping area, and the at least part of the first non-overlapping area from the first portion; and
   presenting the user tailored video from the video server on the screen of the playback device.

2. The method of claim 1, wherein the primary stream, the enhanced stream, and the user tailored video stream are time synchronized to each other.

3. The method of claim 1, further comprising:
   concurrently conveying the primary stream and the user tailored video from the video server to the playback device.

4. The method of claim 1, wherein the primary stream is a broadcast stream of an event that is broadcasted by a broadcast source providing video coverage for the event, wherein at the time the user input was conveyed the screen showed video content of the primary stream.

5. The method of claim 1, wherein the user input is a portion of an continuous input to "pan" or "zoom" the screen in sequential increments of distance over time, wherein input is a continuous input comprising a first distance input at a first time, a second distance input at a second time, and a third distance input at a third time, wherein the adjustment represents a shifting of the first distance at the first time, wherein the conveying of the user input, the receiving of the tailored video, and the presenting of the tailored video are repeated for the second distance input and for the third distance input.

6. The method of claim 5, wherein the user input is an input to pan the screen.

7. The method of claim 5, wherein the user input is an input to zoom the screen.

8. The method of claim 1, wherein the primary stream and the enhanced stream comprise video for a live event being concurrently captured by the first camera and the second camera, wherein the playback device shows the live event on the screen in real time or in near real time as the user tailored video.

9. The method of claim 1, wherein different user inputs are concurrently submitted to the video server by different users via the plurality of user playback devices, which results in the video server customizing user specific video streams per the different user inputs for the different users for playback on the plurality of user playback device.

10. The method of claim 1, wherein the user tailored video comprises a stitched together region that is a continuous video region stitched together along a horizontal or vertical plane.

11. The method of claim 1, wherein throughout the method, an audio output from the user playback device is substantially unaffected and is audibly presented via the user playback device without substantial interruption.

12. A playback device comprising:
at least one processor;
a screen;
a transceiver; and
at least one non-transitory memory storing program instructions, wherein execution of the program instructions by the processor results in the playback device:
receive video over a network from a video server, said video comprising media content of a geographic area which is concurrently covered by a first camera that captures a first portion of the geographic area in a first field of view and by a second camera that captures a second portion of the geographic area in a second field of view, wherein an overlapping area exists, wherein the first portion includes the overlapping area and a first non-overlapping area, wherein the second portion includes the overlapping area and a second non-overlapping area, wherein a primary stream of video content corresponds content including the overlapping area and the first non-overlapping area, wherein an enhanced stream of video content corresponds to content including the overlapping area and the second non-overlapping area;
convey to the video server from the playback device, a user input for user tailored video to be delivered to the playback device, wherein the user input is an input for an adjustment to shift-to-the right, to shift-to-left, to upwards-shift, or to downwards-shift video content shown on a screen of the user playback device, wherein at a time the user input was conveyed the screen showed video content that did not include content from the second non-overlapping area but did include content from the first portion, wherein the adjustment as specified by the user input would result in playback video that shows at least part of the second non-overlapping area from the second portion, at least part of the overlapping area, and at least part of the first non-overlapping area from the first portion;
in response to conveying of the user input, receive at the playback device the user tailored video from the video server, wherein the user tailored video per the adjustment comprises at least part of the second non-overlapping area from the second portion, the at least part of the overlapping area, and the at least part of the first non-overlapping area from the first portion; and
present the user tailored video from the video server on the screen of the playback device.

13. The playback device of claim 12, wherein the primary stream, the enhanced stream, and the user tailored video stream are time synchronized to each other.

14. The playback device of claim 12, wherein the playback device is a mobile phone.

15. The playback device of claim 12, wherein the playback device is one of an electronic tablet, a personal computer, a television, and a notebook computer.

16. The playback device of claim 12, wherein the primary stream and the enhanced stream comprise video for a live event being concurrently captured by the first camera and the second camera.

17. A computer program product comprising:
one or more non-transitory storage mediums,
program instructions stored on the one or more non-transitory storage mediums, wherein the program instructions are able to be executed by one or more processors execute the program instructions to:
receive video over a network from a video server, said video comprising media content of a geographic area which is concurrently covered by a first camera that captures a first portion of the geographic area in a first field of view and by a second camera that captures a second portion of the geographic area in a second field of view, wherein an overlapping area exists, wherein the first portion includes the overlapping area and a first non-overlapping area, wherein the second portion includes the overlapping area and a second non-overlapping area, wherein a primary stream of video content corresponds content including the overlapping area and the first non-overlapping area, wherein an enhanced stream of video content corresponds to content including the overlapping area and the second non-overlapping area;
convey to the video server from the playback device, a user input for user tailored video to be delivered to the playback device, wherein the user input is an input for an adjustment to shift-to-the right, to shift-to-left, to upwards-shift, or to downwards-shift video content shown on a screen of the user playback device, wherein at a time the user input was conveyed the screen showed video content that did not include content from the second non-overlapping area but did include content from the first portion, wherein the adjustment as specified by the user input would result in playback video that shows at least part of the second non-overlapping area from the second portion, at least part of the overlapping area, and at least part of the first non-overlapping area from the first portion;
in response to conveying of the user input, receive at the playback device the user tailored video from the video server, wherein the user tailored video per the adjustment comprises at least part of the second non-overlapping area from the second portion, the at least part of the overlapping area, and the at least part of the first non-overlapping area from the first portion; and
present the user tailored video from the video server on the screen of the playback device.

18. The computer program product of claim 17, wherein the primary stream, the enhanced stream, and the user tailored video stream are time synchronized to each other.

19. The computer program product of claim 17, wherein the program instructions are able to be executed by one or more processors execute the program instructions to:
concurrently conveying the primary stream and the user tailored video from the video server to the playback device.

20. The computer program product of claim 17, wherein the primary stream is a broadcast stream of an event that is broadcasted by a broadcast source providing video coverage for the event, wherein at the time the user input was conveyed the screen showed video content of the primary stream.

* * * * *